US 6,665,277 B1

(12) United States Patent
Sriram

(10) Patent No.: US 6,665,277 B1
(45) Date of Patent: Dec. 16, 2003

(54) COMMA FREE CODES FOR FAST CELL SEARCH USING TERTIARY SYNCHRONIZATION CHANNEL

(75) Inventor: Sundararajan Sriram, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/418,907

(22) Filed: Oct. 15, 1999

Related U.S. Application Data

(60) Provisional application No. 60/104,445, filed on Oct. 16, 1998.

(51) Int. Cl.$^7$ ................................................ H04B 7/212
(52) U.S. Cl. ........................ 370/324; 370/342; 375/145
(58) Field of Search ................. 370/335, 342, 370/345, 324; 375/135, 136, 137, 145, 149, 146, 147; 455/502, 517

(56) References Cited

U.S. PATENT DOCUMENTS 3,753,228 A * 8/1973 Nickolas et al. ............ 375/365
5,663,715 A * 9/1997 Godoroia .................... 370/350
6,185,244 B1 * 2/2001 Nystrom et al. ............ 375/145

* cited by examiner

Primary Examiner—Dwayne Bost
Assistant Examiner—Eliseo Ramos-Feliciano
(74) Attorney, Agent, or Firm—Ronald O. Neerings; Wade James Brady, III; Frederick J. Telecky, Jr.

(57) ABSTRACT

A method of processing data comprises the receiving a frame of data having a predetermined number of time slots (502,504,506). Each time slot comprises a respective plurality of data symbols (520). The method further comprises a primary (508), a secondary (510) and a tertiary (512) synchronization code in each said predetermined number of time slots.

14 Claims, 5 Drawing Sheets

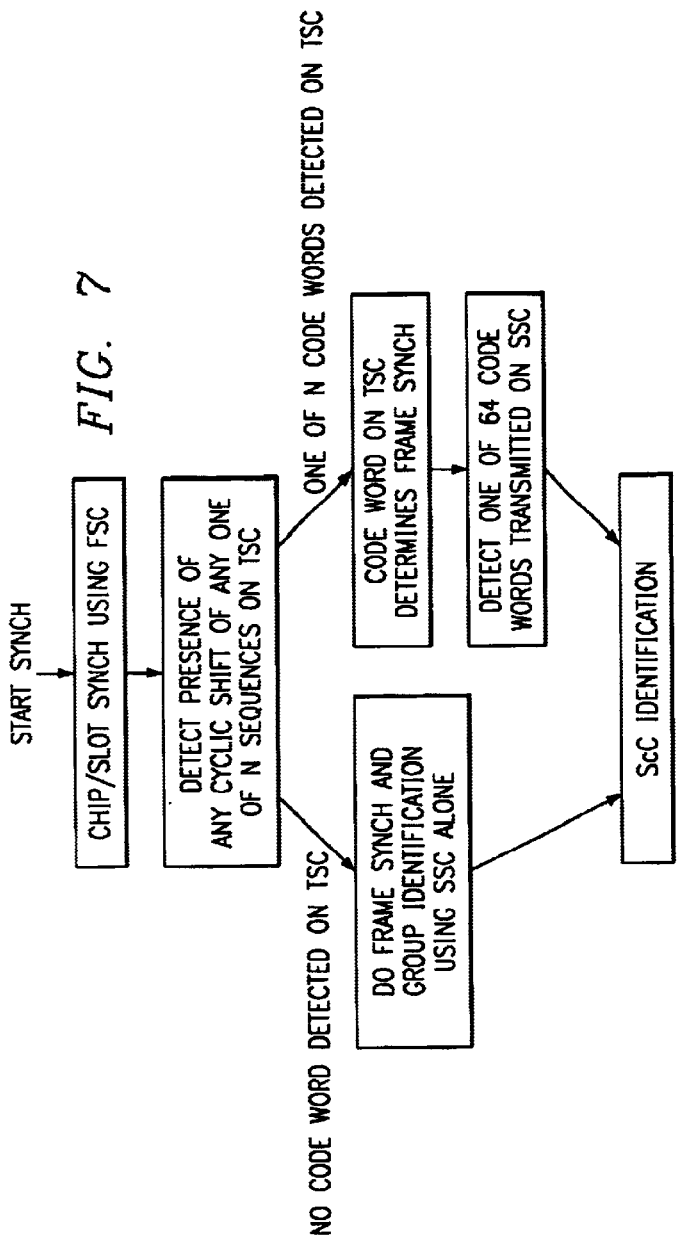

COMMA FREE CODES FOR FAST CELL SEARCH USING TERTIARY SYNCHRONIZATION CHANNEL

CLAIM TO PRIORITY OF PROVISIONAL APPLICATION

This application claims priority under 35 U.S.C. §119(e)(1) of provisional application No. 60/104,445, filed Oct. 16, 1998.

FIELD OF THE INVENTION

This invention relates to wideband code division multiple access (WCDMA) for a communication system and more particularly to cell search for WCDMA using primary, secondary and tertiary synchronization codes.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for net generation wideband code division multiple access (WCDMA) communication systems as described in U.S. Pat. No. 6,345,069, entitled *Simplified Cell Search Scheme for First and Second Stage*, issued Feb. 5, 2002, and incorporated herein by reference. These WCDMA systems are coherent communications systems with pilot symbol assisted channel estimation schemes. These pilot symbols are transmitted as quadrature phase shift keyed (QPSK) sown data in predetermined time frames to any receivers within the cell or within range The frames may propagate in a discontinuous transmission (DTX) mode within the cell. For voice traffic, transmission of user data occurs when the user speaks, but no data symbol transmission occurs when the user is silent. Similarly for packet data, the use data may be transmitted only when packets are ready to be sent. The frames include pilot symbols as well as other control symbols such as transmit power control (IPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N) This number of chips in the symbol is the spreading factor.

A WCDMA base station must broadcast primary or first (FSC) and secondary (SSC) synchronization codes to properly establish communications with a mobile receiver. The FSC identifies the slot timing from the transmitting base station. The SSC further identifies a group of sixteen scrambling codes, one of which is assigned to the transmitting base station. Referring now to FIG. 1, there is a simplified block diagram of a circuit of the prior art for generating primary and secondary synchronization codes. These synchronization codes modulate or spread the transmitted signal so that a mobile receiver may identify it. Circuits 102 and 110 each produce a 256 cycle Hadamard sequence at leads 103 and 111, respectively. Either a true or a complement of a 16-cycle pseudorandom noise (PN) sequence, however, selectively modulates both sequences. This 16-cycle PN sequence is preferably a binary Lindner sequence given by Z={1,1,-1,-1,-1,1,-1,1, 1,-1,1,1,1,-1,1}. Each element of the Lindner sequence is further designated $Z_1$-$Z_{16}$, respectively. Circuit 108 generates a 256-cycle code at lead 109 as a product of the Lindner sequence and each element of the sequence. The resulting PN sequence at lead 109, therefore, has the form {Z,Z,-Z,-Z,-Z,-Z,Z,-Z,Z,Z,-Z,Z, Z,Z,-Z,Z}. Exclusive-OR circuit 112 modulates the Hadamard sequence on lead 111 with the PN sequence on lead 109, thereby producing a FSC on lead 114. Likewise, exclusive-OR circuit 104 modulates the Hadamard sequence on lead 103 with the PN sequence on lead 109, thereby producing an SSC on lead 106.

A WCDMA mobile communication system must initially acquire a signal from a remote base station to establish communications within a cell. This initial acquisition, however, is complicated by the presence of multiple unrelated signals from the base station that are intended for other mobile systems within the cell as well as signals from other base stations. The base station continually transmits a special signal at 16 KSPS on a perch channel, much like a beacon, to facilitate this initial acquisition. The perch channel format includes a frame with sixteen time slots, each having a duration of 0.625 milliseconds. Each time slot includes four common pilot symbols, four transport channel data symbols and two synchronization code symbols. These synchronization code symbols include the FSC and SSC symbols transmitted in parallel. These synchronization code symbols are not modulated by the cell-specific long code, so a mobile receiver can detect the FSC and SSC transmitted by an unknown base station. Proper identification of the FSC and SSC by the mobile receiver, therefore, limits the final search to one of sixteen scrambling codes that specifically identify a base station within the cell to a mobile unit.

Referring to FIG. 2, there is a match filter circuit of the prior art for detecting the FSC and SSC generated by the circuit of FIG. 1. The circuit receives the FSC symbol from the transmitter as an input signal IN on lead 200. The signal is periodically sampled in response to a clock signal by serial register 221 at an oversampling rate n. Serial register 221, therefore, has 15*n stages for storing each successive sample of the input signal IN. Serial register 221 has 16 (N) taps 242–246 that produce 16 respective parallel tap signals. A logic circuit including 16 XOR circuits (230, 232, 234) receives the respective tap signals as well as 16 respective PN signals to produce 16 output signals (231, 233, 235). This PN sequence matches the transmitted sequence from circuit 108 and is preferably a Lindner sequence. Adder circuit 248 receives the 16 output signals and adds them to produce a sequence of output signals at terminal 250 corresponding to the oversampling rate n.

A 16-symbol accumulator circuit 290 receives the sequence of output signals on lead 250. The accumulator circuit 290 periodically samples the sequence on lead 250 in serial register 291 in response to the clock signal at the oversampling rate n. Serial register 291, therefore, has 240*n stages for storing each successive sample. Serial register 291 has 16 taps 250–284 that produce 16 respective parallel tap signals. Inverters 285 invert tap signals corresponding to negative elements of the Lindner sequence.

Adder circuit 286 receives the 16 output signals and adds them to produce a match signal MAT at output terminal 288 in response to an appropriate FSC or SSC.

Referring now to FIG. 3A, several problems arise with this method of FSC and SSC transmission and detection. During first step or first stage acquisition, the receiver must match the 256-chip FSC on a first perch channel to identify a base station transmission. In the second stage of acquisition, the mobile receiver must match the SSC to determine which of 32 possible groups of 16 synchronization codes (ScC) are being transmitted and complete frame synchronization by determining which of 16 time slots is the first in the frame. Finally, during third stage acquisition, the receiver must determine which of 16 codes in the code group is being transmitted. This detection scheme, therefore, limits the mobile receiver to identification of a maximum of 512 base stations corresponding to the 32 groups of 16 scrambling codes each. With the current proliferation of base stations and mobile receivers, however, this has become an unacceptable limitation. Furthermore, simply increasing the number of codes per group or the number of groups dramatically increases time and complexity of the mobile receiver match circuit. For example, the present detection scheme requires matching 32 possible codes over 16 possible frames or 512 possible combinations. Thus, an increase to 64 groups would introduce 1024 possible combinations to match. Finally, the time and power required to match such an inordinate number of combinations is prohibitive.

Turning now to FIG. 3B, other designs of the prior art have tried to resolve this problem by adding a separate step for frame synchronization prior to synchronization code group identification. These modifications to the synchronization scheme also envision an alternative embodiment wherein synchronization code group identification precedes the frame synchronization step (FIG. 3C). This modified synchronization scheme (FIG. 3B) adds a third synchronization code (TSC) dedicated to frame synchronization (FIG. 4). This dedicated code enables the receiver to complete frame synchronization prior to synchronization code group identification. The TSC is transmitted on a third perch channel at the same symbol time as the FSC and SSC. The long code or original ScC is masked during this symbol time, so that none of the FSC, SSC or TSC are modulated by this long code. The TSC, however, is transmitted only on eight even numbered time slots [0,2,4,...,14] of each frame and utilizes the same eight 256-chip codes per frame for each code group.

Several problems with the modified synchronization scheme of FIG. 3B and FIG. 3C render them less than ideal. First, additional power allocated to the TSC will limit system capacity. Second, a balance of power becomes more complex due to TSC codes only on alternate frames. Finally, although SSC matching is simplified, it remains complex and time consuming.

SUMMARY OF THE INVENTION

These problems are resolved by a method of processing data comprising receiving a frame of data having a predetermined number of time slots, wherein each time slot comprises a respective plurality of data symbols. The method further comprises receiving a primary, a secondary and a tertiary synchronization code in each said predetermined number of time slots.

The present invention reduces circuit complexity of FSC, SSC and TSC identification. Identification time, processing power and circuit complexity are further reduced.

BRIEF DESCRIPTION OF THE DRAWINGS

A more complete understanding of the invention may be gained by reading the subsequent detailed description with reference to the drawings wherein:

FIG. 6 is a diagram showing a transmit sequence for secondary and tertiary synchronization codes of the present invention;

FIG. 7 is a flow chart showing a method of synchronization code identification of the present invention; and FIG. 8 is an example of 16 length-16 comma-free codes that may be transmitted as the tertiary synchronization code of the present invention.

DETAILED DESCRIPTION OF THE PREFERRED EMBODIMENTS

Figure 1:
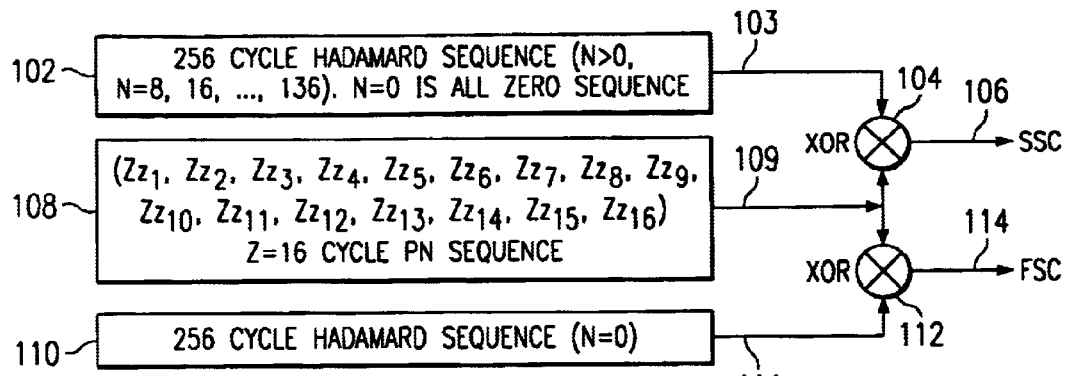
FIG. 1 is a simplified block diagram of a circuit of the prior art for generating primary and secondary synchronization codes.
Figure 3A:
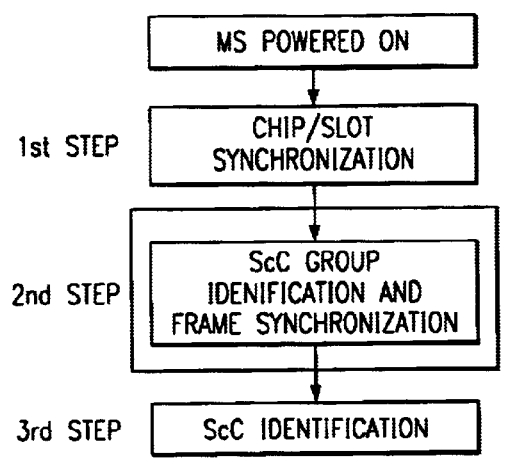
FIGS. 3A–C are synchronization methods of the prior art.
Figure 3B:
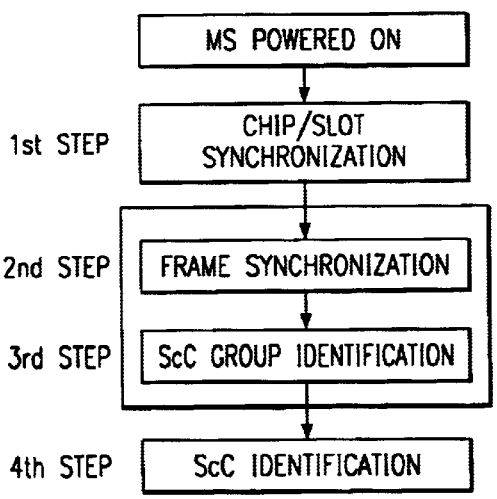
Figure 3C:
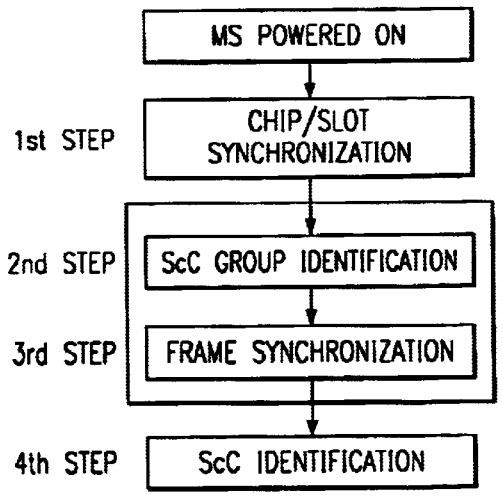
Figure 5:
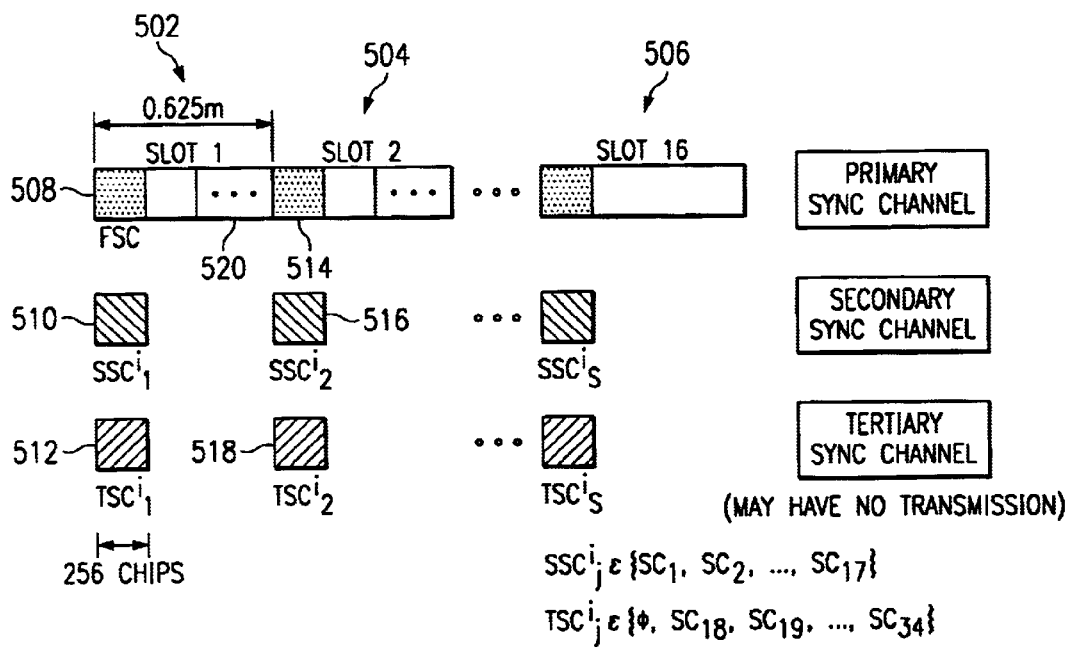
FIG. 5 is a timing diagram showing a sequence of first, second and third synchronization codes of the present invention.
Figure 8:
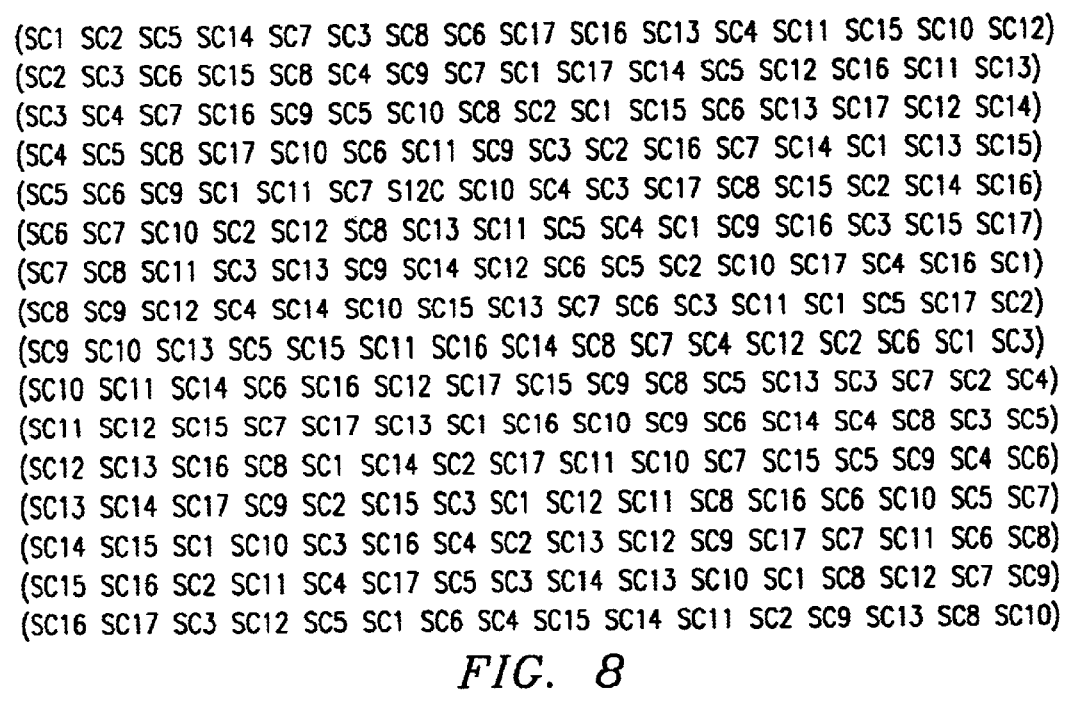

Referring now to FIG. 5, there is a timing diagram of a showing a sequence of first, second and third synchronization codes of the present invention. The timing diagram includes a frame of data having a predetermined number of time slots 502,504,506. This predetermined number of time slots preferably includes sixteen time slots in each frame. Each time slot, for example time slot 502 has a duration of 0.625 milliseconds. The time slot is further subdivided into equal symbol time periods. There are preferably ten symbol time periods in time slot 502. A first synchronization code (FSC) 508 is transmitted on a primary synchronization channel during a first symbol time of the time slot. A second synchronization code (SSC) 510 is transmitted on a secondary synchronization channel during the first symbol time of the time slot. A tertiary synchronization code (TSC) 512 is transmitted on a tertiary synchronization channel during the first symbol time of the time slot. Transmission of this tertiary synchronization code is accomplished via a circuit as in FIG. 1 having an additional multiplier circuit similar to circuit 104. This additional multiplier circuit receives the pseudo-noise (PN) code on lead 109 and a selected tertiary synchronization code and produces a modulated tertiary synchronization code. Each of the sixteen secondary and tertiary synchronization codes within the frame are preferably different from each other. Sixteen of the comma free codes in a frame form a comma free code word. These synchronization codes are preferably sixteen comma free codes taken from a set or alphabet of seventeen 256-chip short codes. This set of seventeen codes is derived from a (16,2) Reed-Solomon code as is well known in the art. Each of the selected sixteen codes corresponds to a respective time slot of the corresponding data frame. The order of the sixteen selected codes provides 256 combinations or comma free code words, each having a minimum distance of 15. These comma free code words are sufficient to uniquely identify one of sixteen groups of sixteen long codes or scrambling codes transmitted by a base station. A preferred embodiment of the present invention transmits sixteen comma free code sequences from the set {$SC_1$, $SC_2$, ..., $SC_{17}$} on the secondary synchronization channel. An exemplary embodiment of these sixteen synchronization codes is enumerated in rows of FIG. 8. The present invention optionally transmits comma free code sequences from the set {$SC_{18}$, $SC_{19}$, ..., $SC_{34}$} on the tertiary synchronization channel as will be explained in detail.

Figure 2:
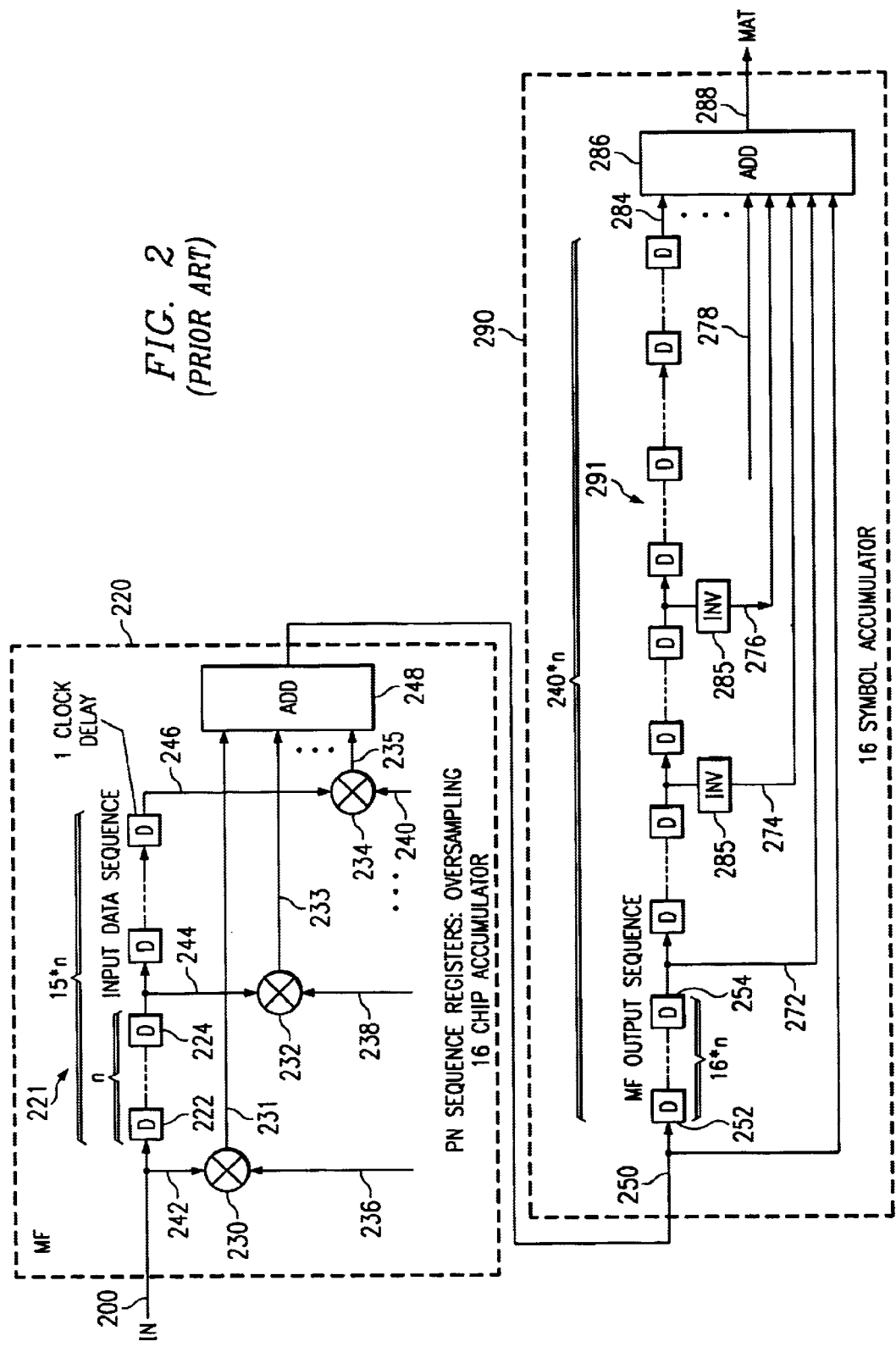
FIG. 2 is a block diagram of a match filter circuit of the prior art for detecting the primary synchronization code of FIG. 1.
Figure 4:
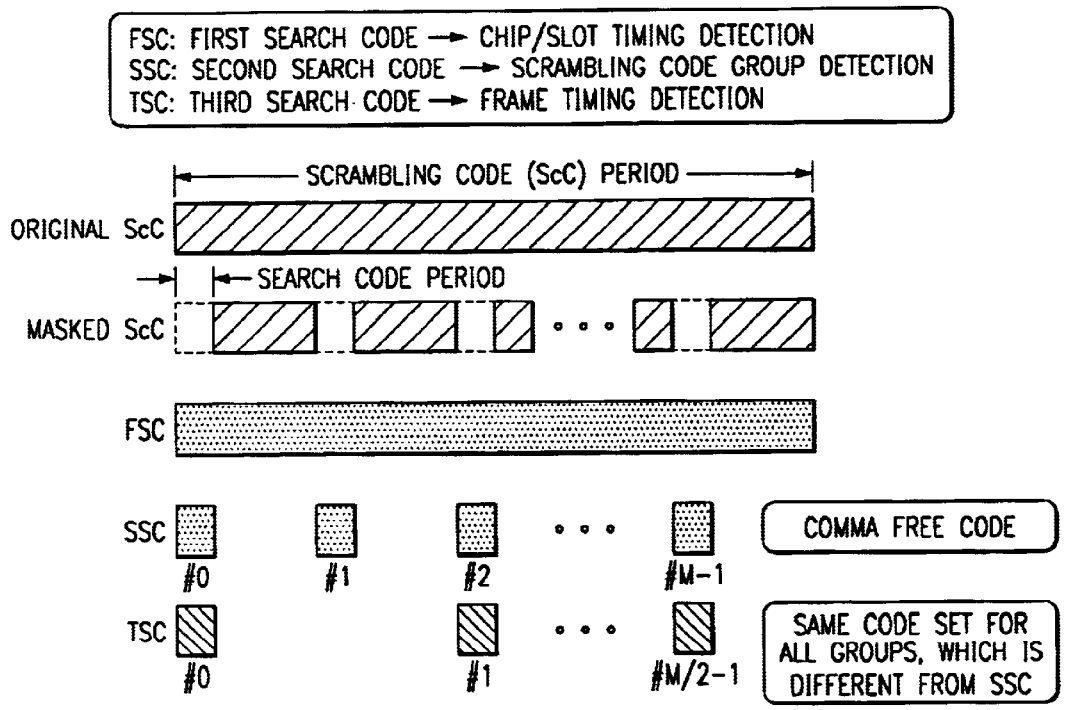
FIG. 4 is a timing diagram showing a sequence of first, second and third synchronization codes of the prior art.

Turning now to FIG. 6, there is a diagram showing a transmit sequence for secondary and tertiary synchronization codes of the present invention. The first row indicates a transmit sequence for $TSC_i=\phi$ representing a null set of sixteen tertiary synchronization codes. In this configuration, the present invention transmits one of sixteen comma free code words on the secondary synchronization channel corresponding to one of sixteen scrambling code groups. Each length-16 comma free code word identifies a respective scrambling code group. Most wireless applications are well suited to this configuration of sixteen groups of sixteen long codes or 256 total long codes. This corresponds to a maximum of 256 different base stations that may be received by a mobile receiver. In this configuration, the mobile receiver attempts to match the TSC with a match filter circuit as in FIG. 2. The match filter, however, fails to detect a match with the TSC null set and produces a low-level output signal MAT on lead 288. This low-level MAT signal is compared with a minimum threshold value by a threshold comparator circuit to recognize the TSC null set. In the absence of a TSC signal from the threshold comparator circuit, the mobile receiver performs frame synchronization and matches the SSC code group during second stage acquisition without the TSC. This is highly advantageous in reducing match time and complexity for frame synchronization and SSC code group identification. Moreover, when the number of scrambling codes in the system is small such as 256, no power is allocated to the TSC, thereby increasing system capacity.

The limitation of 256 code groups, however, is overly restrictive for dense urban areas. The present invention, therefore, provides for virtually unlimited additional codes by transmitting N distinct comma free codes on the tertiary synchronization channel, where N is an integer. This permits transmission of 64 comma free codes on the secondary synchronization channel without increasing match complexity. Operation of the present invention will be described in detail with reference to the flow chart of FIG. 7. The first step of the acquisition process includes identification of a base station FSC by a mobile receiver. Next, the mobile receiver must attempt to match one of the N distinct code words or sequences on the TSC. If no code word is detected, the mobile receiver produces a low-level match signal MAT as previously described and proceeds along the left branch of the flow chart. Alternatively, if the mobile receiver detects one of the N comma free codes on the tertiary synchronization channel, it proceeds along the right branch of the flow chart. The mobile receiver uses the TSC match to synchronize the frame of the received signal. The receiver then uses the TSC code to determine the proper frame offset of the code group on the SSC. When the TSC is present, for example, one of 64 comma free codes is transmitted on the secondary synchronization channel. When N has a maximum value of four, there are N*64 or 256 possible scrambling codes. Thus, the mobile receiver uses the TSC to provide both frame synchronization and partial synchronization code group identification.

This two-step code group identification is highly advantageous in reducing synchronization match time and complexity for expanded synchronization code group sets. When there is no TSC code, the mobile receiver need only match one of sixteen code groups and one of sixteen codes within the group for sixteen cyclic shifts of time slots within a frame. In this case, the code group match of the SSC provides frame synchronization. This yields a match complexity of $16_3$ or half the complexity of the prior art circuits having thirty-two codes per group. Alternatively, when one of N distinct code words is detected on the tertiary synchronization channel, frame synchronization is completed.

Although the invention has been described in detail with reference to its preferred embodiment, it is to be understood that this description is by way of example only and is not to be construed in a limiting sense. For example, the N comma free codes may be any positive integer that does not exceed the possible combinations of the comma free alphabet. Moreover, other codes may be readily adapted to the present invention to accommodate design variations by one of ordinary skill in the art having access to the instant specification. For example, comma free codes of the present invention may be developed from a (15,2) Reed-Solomon code for a format with fifteen time slots per frame.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A method, comprising the steps of:
   receiving a frame of data having a predetermined number of time slots, each time slot being adjacent another time slot;
   receiving a plurality of data symbols in each respective time slot;
   receiving a primary, a secondary and a tertiary synchronization code over respective channels in each said predetermined number of time slots;
   matching the tertiary synchronization code with a predetermined code;
   producing a match signal in response to the step of matching;
   comparing the match signal to a threshold signal;
   identifying a first time slot of the frame by the tertiary synchronization code in response to a first state of the match signal; and
   identifying the first time slot of the frame by the secondary synchronization code in response to a second state of the match signal that is different from the first state.

2. A method, comprising the steps of:
   receiving a plurality of frames of data, each frame having a predetermined number of time slots, each time slot being adjacent another time slot;
   receiving a primary synchronization code over a first channel in each said predetermined number of time slots;
   receiving a secondary synchronization code over a second channel in each said predetermined number of time slots; and
   receiving a tertiary synchronization code over a third channel in each said predetermined number of time slots, wherein at least two of the plurality of frames comprise different tertiary synchronization codes.

3. A method as in claim 1, wherein the secondary and the tertiary synchronization codes identify a subset of codes.

4. A method as in claim 3, wherein the secondary and tertiary synchronization codes are formed from a predetermined order of synchronization code elements, the predetermined order corresponding to the subset of codes.

5. A method as in claim 1, wherein the secondary and tertiary synchronization codes are formed from a predetermined order of common synchronization code elements.

6. A method as in claim 1, wherein a mobile receiver identifies a first time slot of the frame by the tertiary synchronization code.

7. A method as in claim 1, further comprising the steps of:
matching the tertiary synchronization code with a predetermined code;
producing a match signal in response to the step of matching;
comparing the match signal to a threshold signal;
identifying a first time slot of the frame by the tertiary synchronization code in response to a first state of the match signal; and
identifying the first time slot of the frame by the secondary synchronization code in response to a second state of the match signal that is different from the first state.

8. A method, comprising the steps of:
transmitting a frame of data having a predetermined number of time slots, each time slot being adjacent another time slot;
transmitting a plurality of data symbols in each respective time slot;
transmitting a primary, a secondary and a tertiary synchronization code over respective channels in each said predetermined number of time slots;
transmitting the secondary and tertiary synchronization codes when a number of long code groups exceeds a predetermined number; and
transmitting the secondary synchronization code and not the tertiary synchronization code in response when the number of long code groups is less than or equal to the predetermined number.

9. A method, comprising the steps of:
transmitting a plurality of frames of data, each frame having a predetermined number of time slots, each time slot being adjacent another time slot;
transmitting a primary synchronization code over a first channel in each said predetermined number of time slots;
transmitting a secondary synchronization code over a second channel in each said predetermined number of time slots; and
transmitting a tertiary synchronization code over a third channel in each said predetermined number of time slots, wherein at least two of the plurality of frames comprise different tertiary synchronization codes.

10. A method as in claim 9, wherein the secondary and the tertiary synchronization codes identify a subset of codes.

11. A method as in claim 10, wherein the secondary and tertiary synchronization codes are formed from a predetermined order of synchronization code elements, the predetermined order corresponding to the subset of codes.

12. A method as in claim 9, wherein the secondary and tertiary synchronization codes are formed from a predetermined order of common synchronization code elements.

13. A method as in claim 9, wherein the tertiary synchronization code order corresponds to an order of time slots in the frame.

14. A method as in claim 9, further comprising the steps of:
transmitting the secondary and tertiary synchronization codes when a number of long code groups exceeds a predetermined number; and
transmitting the secondary synchronization code and not the tertiary synchronization code in response when the number of long code groups is less than or equal to the predetermined number.

* * * * *